(12) United States Patent
VanTine

(10) Patent No.: US 7,945,640 B1
(45) Date of Patent: May 17, 2011

(54) METHODS AND APPARATUS FOR NETWORK PROVISIONING

(75) Inventor: Lee W. VanTine, Oxford, MA (US)

(73) Assignee: EMC Corporation, Hopkinton, MA (US)

( * ) Notice: Subject to any disclaimer, the term of this patent is extended or adjusted under 35 U.S.C. 154(b) by 549 days.

(21) Appl. No.: 11/862,427

(22) Filed: Sep. 27, 2007

(51) Int. Cl.
*G06F 15/16* (2006.01)

(52) U.S. Cl. ......................... 709/217; 709/223

(58) Field of Classification Search .......... 709/220–226, 709/217
See application file for complete search history.

(56) References Cited

U.S. PATENT DOCUMENTS

| | | | |
|---|---|---|---|
| 7,206,863 B1 | 4/2007 | Oliveira et al. | |
| 2002/0103889 A1* | 8/2002 | Markson et al. | 709/223 |
| 2003/0061491 A1* | 3/2003 | Jaskiewicz et al. | 713/182 |
| 2003/0069972 A1* | 4/2003 | Yoshimura et al. | 709/226 |
| 2003/0212781 A1* | 11/2003 | Kaneda et al. | 709/223 |
| 2004/0117438 A1* | 6/2004 | Considine et al. | 709/203 |
| 2004/0243699 A1* | 12/2004 | Koclanes et al. | 709/224 |
| 2006/0075191 A1* | 4/2006 | Lolayekar et al. | 711/114 |
| 2006/0080416 A1* | 4/2006 | Gandhi | 709/220 |
| 2006/0129738 A1* | 6/2006 | Zohar et al. | 711/3 |
| 2006/0155831 A1* | 7/2006 | Chandrasekaran | 709/220 |
| 2006/0236061 A1* | 10/2006 | Koclanes | 711/170 |
| 2007/0220310 A1* | 9/2007 | Sharma et al. | 714/6 |
| 2009/0089462 A1* | 4/2009 | Strutt | 710/16 |

\* cited by examiner

*Primary Examiner* — Andrew Caldwell
*Assistant Examiner* — Loi Tran
(74) *Attorney, Agent, or Firm* — Daly, Crowley, Mofford & Durkee, LLP

(57) ABSTRACT

In one aspect, a computer-implemented method includes receiving a storage request having a storage pool policy, a volume creation policy, and volume creation attributes; searching available storage in a dynamic storage pool and storage connectivity elements based upon the storage request; selecting front-end and back-end virtual local area networks (VLANs), zones, and virtual initiators (VIs) matching a service level agreement (SLA) for the storage request; determining a provisioning plan for the storage request including an array, array ports, the virtual targets (VTs), the VIs, the zones, the VLANs, virtual volume identity, and logical units by examining resources for the VTs and VIs including resource usage and input/output operations per second to select a VT/VI pair based on the SLA; masking and mapping the virtual volume to the array ports to the VIs; creating a back-end zone for connectivity between the virtual targets and host bus adaptor ports; and outputting the provisioning plan to a user for display.

19 Claims, 13 Drawing Sheets

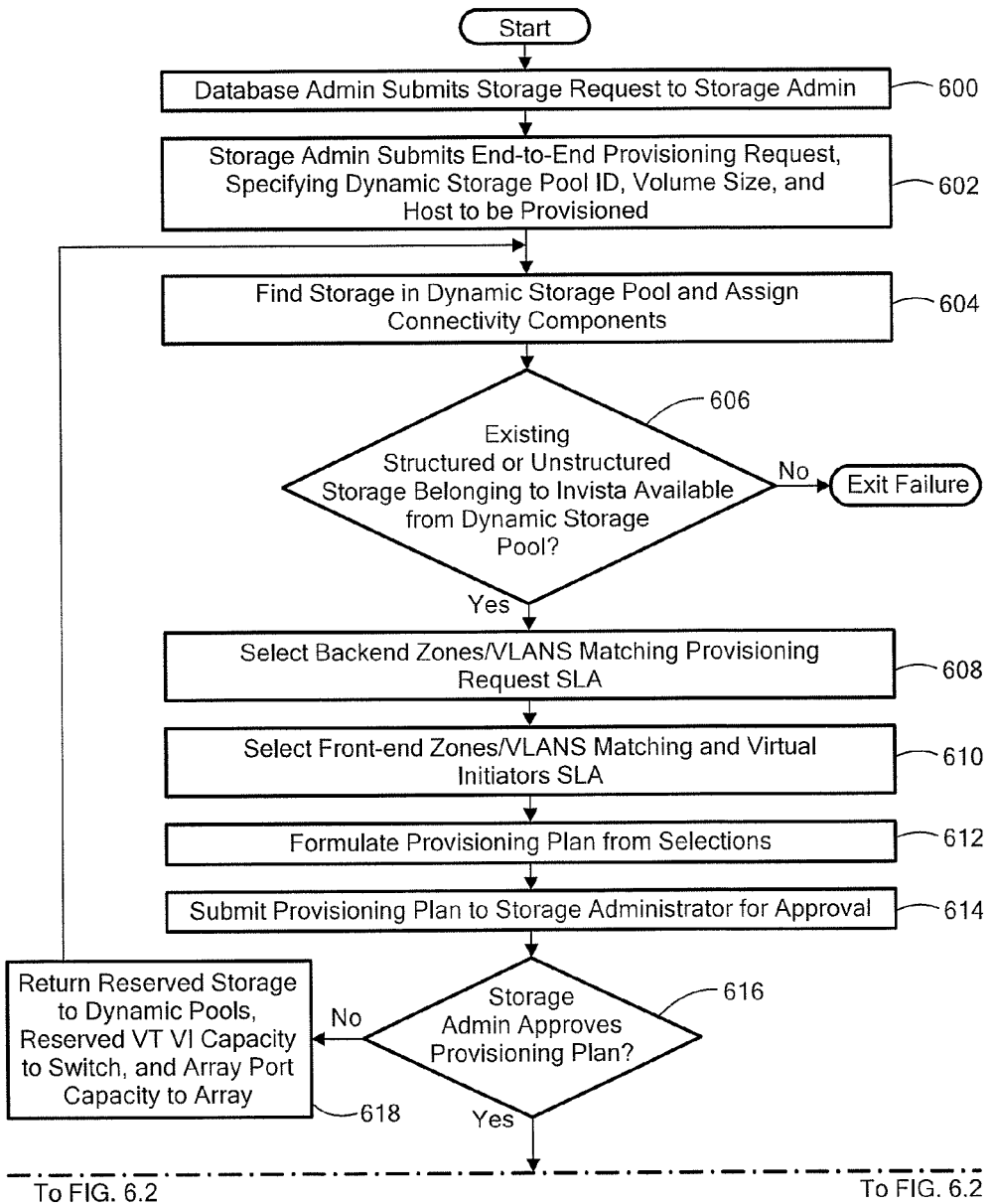
*FIG. 6.1*

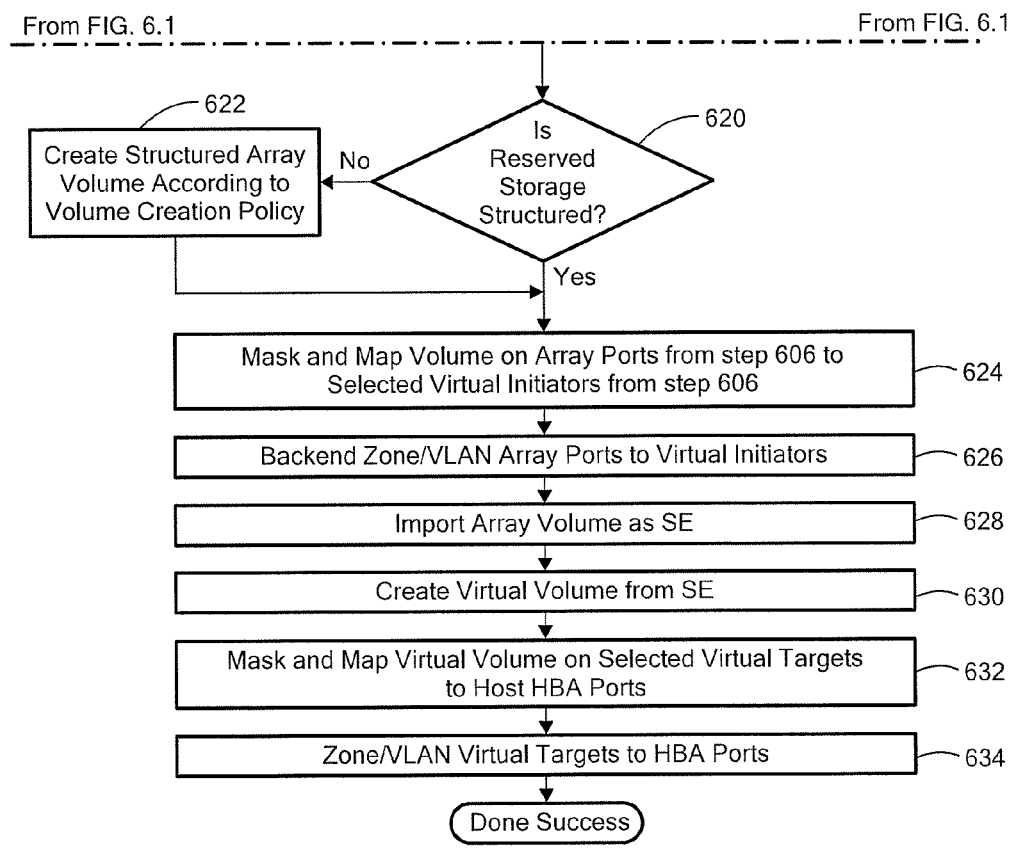
*FIG. 6.2*

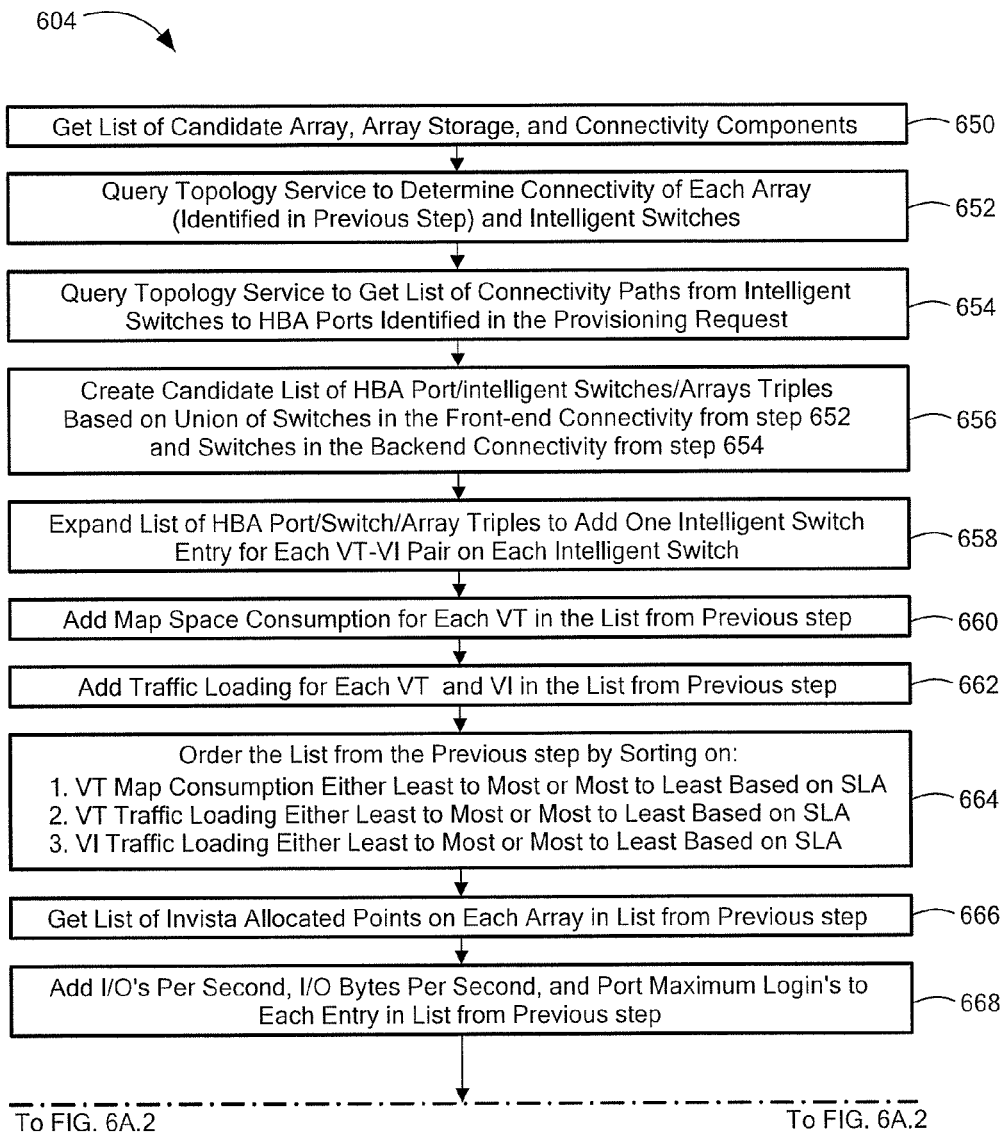
FIG. 6A.1

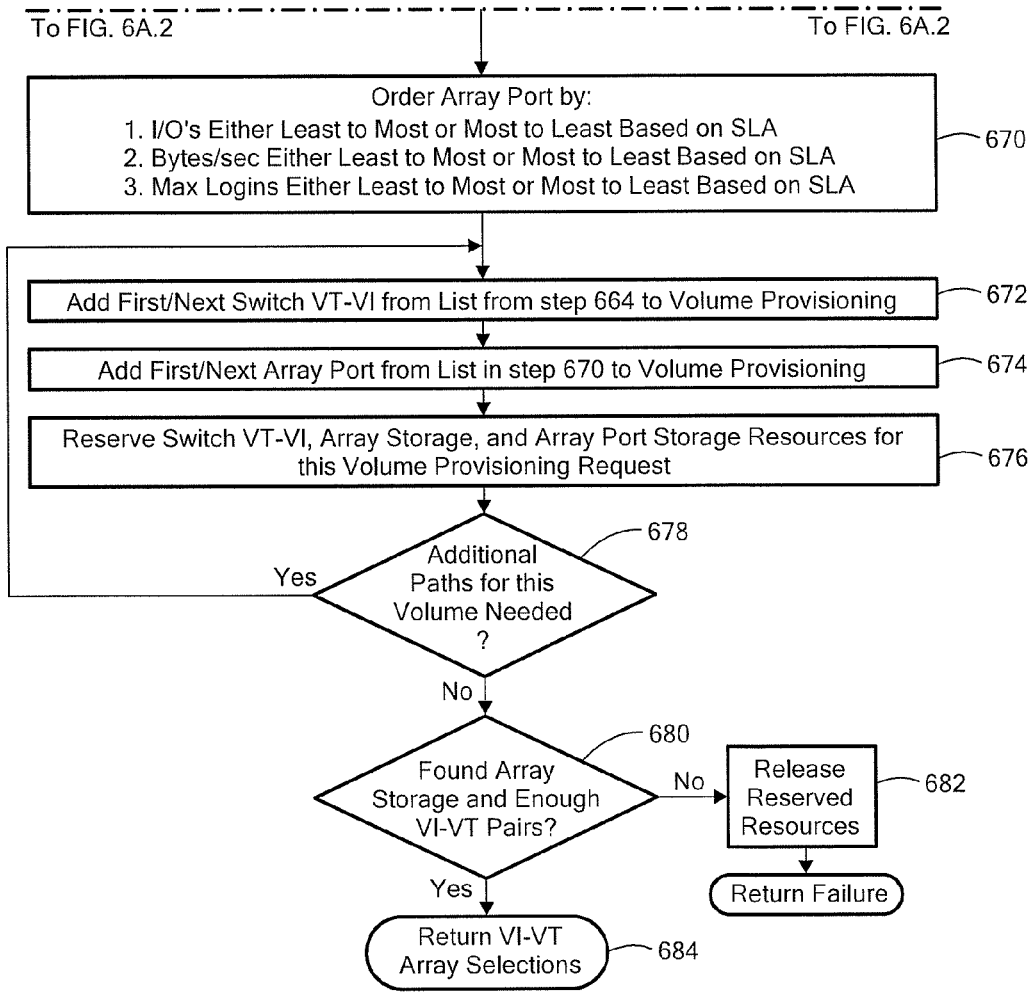
FIG. 6A.2

Volume Attributes

Attributes from Profile (○)  
804 — Oracle DB Profile with HA  
802 — Accounting Internal App  
Symmetrix Storage with RAID5  
Windows Personal Data

Specify Attributes (●) 812 814
- ☐ Meta Volume Allowed
- ☑ Clones — Number of Clones [3]
- ☑ Mirrors — Number of Mirrors [1]
- ☑ Snapshots — Number of Mirrors [5]
- ☐ Remotely Replicated Array Type: Clarion  
Symmetrix / Shark / Thunder — 818

RAID: RAID 5  
RAID 0 / RAID 1 / RAID 1+0 / RAID 0+1 / RAID 4 — 820

Storage Type: FC 7500  
FC10000 / FC 7500 / SATA 7500 — 822

Volume Size: 20 MB / GB / TB / Blocks — 824

*These are the only options that must be set. All other attributes are supplied by selecting a Storage file. If Specify Storage Attributes is selected the user supplies all storage parameters.*

Volume Identity
Volume Name: Volume-1    Manual LUN ID: Volume-1
— 826       828       830

Select Host Ports to be Provisioned
Host  
 HBA-1  
 HBA-2  
Host02    832  
 HBA-1  
 HBA-2  
 HBA-3

Path Attributes
Array Port Selection Policy  
○ Balanced  ● Least Used — Backend Zone/VLAN [23]

Virtual Target Selection Policy — 838  
○ Balanced  ● Least Used — Frontend Zone/VLAN [2]  
840       842

*FIG. 8*

| 1202 | 1204 | 1208 | 1210 | 1212 | 1214 | 1216 | 1206 |
|---|---|---|---|---|---|---|---|
| HBA 1 Port 0 | Intelligent Switch 1 | VI1 VT1 | VT Map Resources | VT/VI IOPS | VT/VI Read Bytes Per Second | VT/VI Write Bytes Per Second | Array 5 |
| HBA 1 Port 0 | Intelligent Switch 1 | VI2 VT2 | VT Map Resources | VT/VI IOPS | VT/VI Read Bytes Per Second | VT/VI Write Bytes Per Second | Array 5 |
| HBA 1 Port 0 | Intelligent Switch 1 | VI3 VT3 | VT Map Resources | VT/VI IOPS | VT/VI Read Bytes Per Second | VT/VI Write Bytes Per Second | Array 5 |
| HBA 1 Port 0 | Intelligent Switch 1 | VI4 VT4 | VT Map Resources | VT/VI IOPS | VT/VI Read Bytes Per Second | VT/VI Write Bytes Per Second | Array 7 |
| HBA 1 Port 0 | Intelligent Switch 1 | VI10 VT10 | VT Map Resources | VT/VI IOPS | VT/VI Read Bytes Per Second | VT/VI Write Bytes Per Second | Array 7 |
| HBA 1 Port 0 | Intelligent Switch 1 | VI11 VT11 | VT Map Resources | VT/VI IOPS | VT/VI Read Bytes Per Second | VT/VI Write Bytes Per Second | Array 7 |
| HBA 1 Port 0 | Intelligent Switch 1 | VI1 VT1 | VT Map Resources | VT/VI IOPS | VT/VI Read Bytes Per Second | VT/VI Write Bytes Per Second | Array 8 |
| HBA 1 Port 0 | Intelligent Switch 1 | VI14 VT14 | VT Map Resources | VT/VI IOPS | VT/VI Read Bytes Per Second | VT/VI Write Bytes Per Second | Array 8 |
| HBA 1 Port 0 | Intelligent Switch 2 | VI6 VT6 | VT Map Resources | VT/VI IOPS | VT/VI Read Bytes Per Second | VT/VI Write Bytes Per Second | Array 1 |
| HBA 1 Port 0 | Intelligent Switch 2 | VI14 VT14 | VT Map Resources | VT/VI IOPS | VT/VI Read Bytes Per Second | VT/VI Write Bytes Per Second | Array 1 |
| HBA 1 Port 0 | Intelligent Switch 2 | VI16 VT16 | VT Map Resources | VT/VI IOPS | VT/VI Read Bytes Per Second | VT/VI Write Bytes Per Second | Array 1 |
| HBA 1 Port 0 | Intelligent Switch 2 | VI12 VT12 | VT Map Resources | VT/VI IOPS | VT/VI Read Bytes Per Second | VT/VI Write Bytes Per Second | Array 9 |
| HBA 1 Port 0 | Intelligent Switch 2 | VI13 VT13 | VT Map Resources | VT/VI IOPS | VT/VI Read Bytes Per Second | VT/VI Write Bytes Per Second | Array 9 |
| HBA 1 Port 0 | Intelligent Switch 2 | VI2 VT2 | VT Map Resources | VT/VI IOPS | VT/VI Read Bytes Per Second | VT/VI Write Bytes Per Second | Array 10 |

METHODS AND APPARATUS FOR NETWORK PROVISIONING

BACKGROUND

As is known in the art, computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

To leverage the value of MSS, these are typically networked in some fashion, Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over Fibre Channel switching fabric using encapsulated SCSI protocols. Each network type has its advantages and disadvantages, but SANs are particularly noted for providing the advantage of being reliable, maintainable, and being a scalable infrastructure but their complexity and disparate nature makes them difficult to centrally manage. Thus, a problem encountered in the implementation of SANs s that the dispersion of resources tends to create an unwieldy and complicated data storage environment. Reducing the complexity by allowing unified management of the environment instead of treating as a disparate entity would be advancement in the data storage computer-related arts. While it is an advantage to distribute intelligence over various networks, it should be balanced against the need for unified and centralized management that can grow or scale proportionally with the growth of what is being managed.

As is also known in the art, storage networks are typically provisioned manually. For example, a user requests storage space where the request can include amount and type of storage. A database administrator submits a storage request to a storage administrator for approval. The storage administrator approves or disapproves the request based upon various criteria. It will be appreciated that this process is time consuming and error prone. In addition, the provisioning is static leading to wasted space, less than optimal use of storage resources, and limited scalability.

SUMMARY

The present invention provides methods and apparatus for providing network provisioning where storage is abstracted for the user. In response to a storage request, available storage is identified taking into account information associated with the storage and connectivity between network components. With this arrangement, a network can be dynamically and automatically provisioned.

In one aspect of the invention, a method comprises receiving a storage request having a storage pool policy, a volume creation policy, and volume creation attributes, searching available storage in a dynamic storage pool and storage connectivity elements based upon the storage request, selecting front-end and back-end virtual local area networks (VLANs), zones, and virtual initiators (VIs) matching a service level agreement (SLA) for the storage request, determining a provisioning plan for the storage request including an array, array ports, the virtual targets (VTs), the VIs, the zones, the VLANs, virtual volume identity, and logical units by examining resources for the VTs and VIs including resource usage and input/output operations per second to select a VT/VI pair based on the SLA, masking and mapping the virtual volume to the array ports to the VIs, creating a back-end zone for connectivity between the virtual targets and host bus adaptor ports, and outputting the provisioning plan to a user for display.

In another aspect of the invention, a method comprises collecting, in response to a storage request, characteristics from a dynamic storage pool definition and parameters from the storage request to generate a dynamic pool request, determining a list of arrays that are associated with a same fabric as host bus adaptors in the dynamic pool request, determining from the list of arrays which arrays in the list of arrays match array types in the dynamic pool request to provide a narrowed list of arrays, determining from the narrowed list of arrays which ones of the arrays having storage matching a service level agreement of the dynamic pool request based on a plurality of attributes, identifying intelligent switches having connectivity to host bus adaptors in the dynamic pool request, and ordering the narrowed list of arrays.

BRIEF DESCRIPTION OF THE DRAWINGS

The foregoing features of this invention, as well as the invention itself, may be more fully understood from the following description of the drawings in which:

FIGS. 6.1 and 6.2 are a flow diagram showing network provisioning;

FIGS. 6A.1 and 6A.2 are a flow diagram showing additional detail for the network provisioning of FIGS. 6.1 and 6.2 including generating VI-VT-array selections;

FIG. 8 is a schematic depiction showing an exemplary graphical user interface;

FIG. 12 is a further tabular representation of provisioning information.

DETAILED DESCRIPTION

Figure 1:
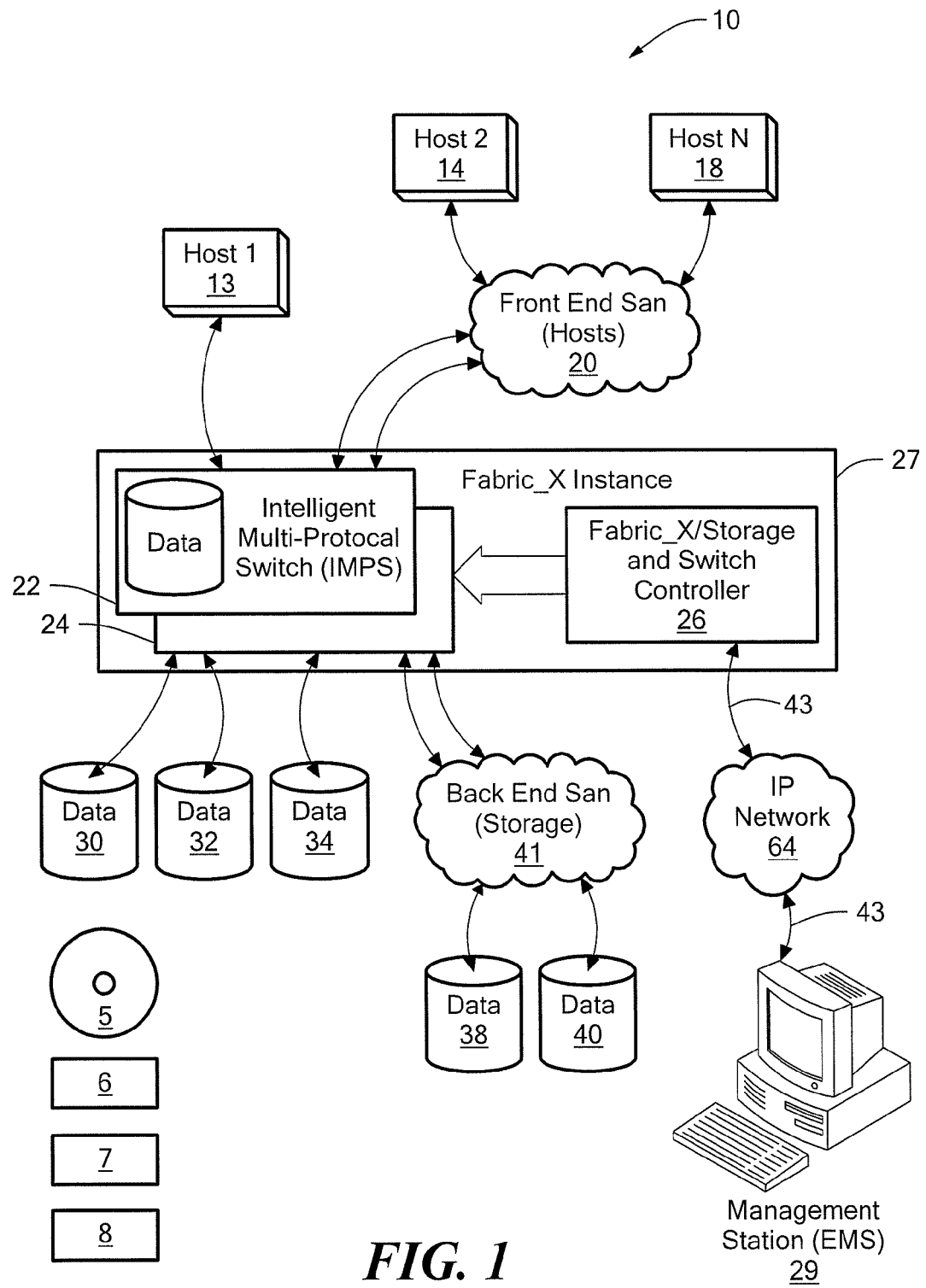
FIG. 1 is a block diagram showing a data storage environment including a new architecture embodying the present invention and which is useful in such an environment.

In one aspect of the invention, methods and apparatus for provisioning a network automatically are provided. Back-end storage is abstracted for a user to enhance the user experience and automatically provisioned in response to storage requests. In another aspect of the invention, storage pools are defined by the characteristics of the storage that the user desires in the storage pool. When storage requests are made, the storage pool is examined for storage candidates for which policies are applied to order the list of candidates. The system can the select storage from the list and allocate the storage. In one embodiment, user-defined attributes can be defined to for dynamic storage selection.

Before describing the invention embodiments in detail an exemplary system is described of which the exemplary provisioning and/or storage pool embodiments can form a part. It is understood that methods and apparatus of the present invention are intended for use in Storage Area Networks (SANs) that include data storage systems, such as the EMC Invista system, Symmetrix Integrated Cache Disk Array system or the Clariion Disk Array system available from EMC Corporation of Hopkinton, Mass. and those provided by vendors other than EMC. It is further understood that while the invention is described in conjunction with certain architectures that may be described using certain vendor-specific terms, such description is not limiting on the invention, but rather is used to facilitate an understanding of the invention.

The methods and apparatus of this invention may take the form, at least partially, of program code (i.e., instructions) embodied in tangible media, such as disks (element 5 in FIG. 1), CD-ROMs 6, hard drives 7, random access or read only-memory 8, or any other machine-readable storage medium, including transmission medium. When the program code is loaded into and executed by a machine, such as a computer, the machine becomes an apparatus for practicing the invention. The media can include portions in different system components, such as memory in a host, an application instance, and or, a management station. The methods and apparatus of the present invention may be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

Exemplary embodiments of the present invention are described in conjunction with a so-called FabricX architecture that allows storage administrators to manage the components of their SAN infrastructure without interrupting the services they provide to their clients. This provides for a centralization of management allowing the storage infrastructure to be managed without requiring host-based software or resources for this management. For example, data storage volumes can be restructured and moved across storage devices on the SAN while the hosts accessing these volumes continue to operate undisturbed.

Such an architecture also allows for management of resources to be moved off of storage arrays themselves, allowing for more centralized management of heterogeneous data storage environments. Advantages provided include: (1) centralized management of a storage infrastructure; (2) storage consolidation and economical use of resources; (3) common replication and mobility solutions (e.g., migration) across heterogeneous storage subsystems; and (4) storage management that is non-disruptive to hosts and storage subsystems Referring now to FIG. 1, reference is now made to a data storage environment 10 including an architecture including the elements of the front-end storage area network 20 and a plurality of hosts 1-N shown as hosts 13, 14, and 18, wherein some hosts may communicate through the SAN and others may communicate in a direct connect fashion, as shown. The architecture includes two intelligent multi-protocol switches (IMPS's) 22 and 24 and storage and switch controller 26 to form a combination 27 which may also be denominated as a FabricX Instance 27. In communication with the Instance through an IP Network 64 and management interface 43 is an element management station (EMS) 29, and back-end storage network 42. Such back-end storage may include one or more storage systems, such as the EMC Clariion and Symmetrix data storage systems from EMC of Hopkinton, Mass.

Generally such a data storage system includes a system memory and sets or pluralities and of multiple data storage devices or data stores. The system memory can comprise a buffer or cache memory; the storage devices in the pluralities and can comprise disk storage devices, optical storage devices and the like. However, in a preferred embodiment the storage devices are disk storage devices. The sets represent an array of storage devices in any of a variety of known configurations. In such a data storage system, a computer or host adapter provides communications between a host system and the system memory and disk adapters and provides pathways between the system memory and the storage device pluralities. Regarding terminology related to a storage system, the host or host network is sometimes referred to as the front end and from the disk adapters toward the disks is sometimes referred to as the back end. Since the system can includes the ability to virtualize disks using LUNs as described below, a virtual initiator may be interchanged with disk adapters. A bus interconnects the system memory, and communicates with front and back end. As will be described below, providing such a bus with switches provides discrete access to components of the system.

The Data Storage Environment 10 provides an architecture that includes what has been described above as a FabricX Instance. Pairs of the IMPS switch are provided for redundancy; however, one skilled in the art will recognize that more or less switches and processors could be provided without limiting the invention and that the Controller could also be provided in redundancy. Storage from various storage subsystems is connected to a specific set of ports on an IMPS. As illustrated, the imported storage assets and these back-end ports make up the Back-End SAN 41 with a networked plurality of data storage arrays 38, and 40, and which also may be directly connected to either IMPS, as shown with arrays 30-34 so connected to the Instance 27 through IMPS 24, but although not shown could also be connected directly to the Storage and Switch Controller.

It is known in SAN networks using Fibre Channel and/or SCSI protocols that such data devices as those represented by disks or storage 30-40 can be mapped using a protocol to a Fibre Channel logical unit (LUN) that act as virtual disks that may be presented for access to one or more hosts, such as hosts 13-18 for I/O operations. LUN's are also sometimes referred to interchangeably with data volumes which at a logical level represent physical storage such as that on storage 30-40.

Over the IP Network 64 and by communicating through the management interface 43, a Storage Administrator using the EMS 29 may create virtual LUN's (Disks) that are composed of elements from the back-end storage. These virtual devices which may be represented, for example by a disk icon (not shown) grouped with the intelligent switch, are made available through targets created on a specific set of intelligent switch ports. Client host systems connect to these 'front-end' ports to access the created volumes. The client host systems, the front-end ports, and the virtual LUN's all form part of the Front-End SAN 20. Note Hosts, such as Host 13 may connect directly to the IMPS.

The combined processing and intelligence of the switch and the FabricX Controller provide the connection between the client hosts in the front-end SAN and the storage in the back-end SAN. The FabricX Controller runs storage applications that are presented to the client hosts. These include the Volume Management, Data Mobility, Snapshots, Clones, and Mirrors, which are terms of art known with FMC's Clariion data storage system. In a preferred embodiment the FabricX Controller implementation is based on the CLARiiON Barracuda storage processor and the CLARiiON Flare software implementation which includes layered drivers that are discussed below.

Figure 2:
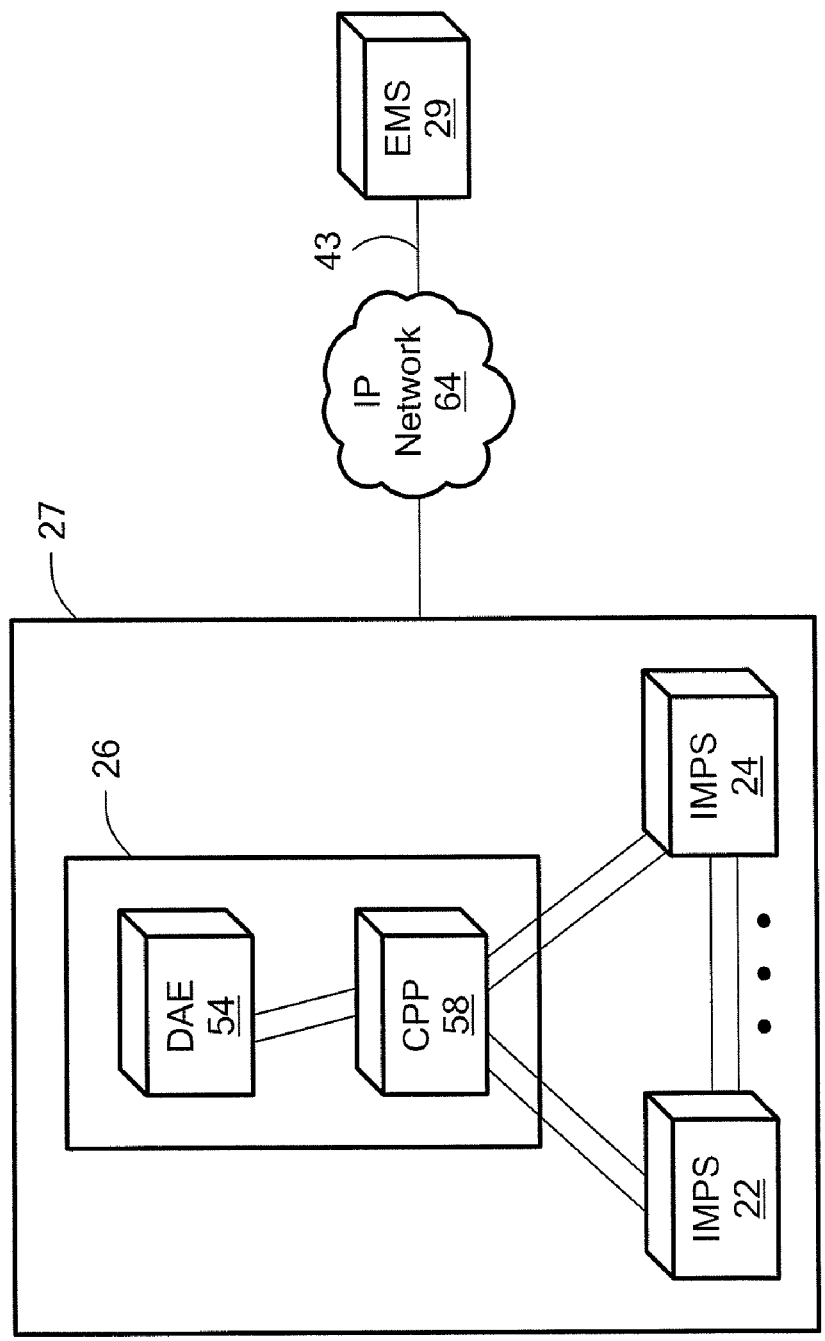
FIG. 2 is another block diagram showing hardware components of the architecture shown in FIG. 1.

Referring to FIG. 2, hardware components of the architecture in the environment shown in FIG. 1 are now described. A FabricX instance 27 is comprised of several discrete hardware subsystems that are networked together. The major subsystems include a Control Path Processor (CPP) 58 and a Disk Array Enclosure (DAE) 54, each described in more detail in FIGS. 3 and 4.

The CPP 58 provides support for storage and switch software applications and runs the software that handles exceptions that occur on the fast-path. Regarding where software runs, in the exemplary embodiment, software for management by the Storage and Switch Controller is shown running on the CPP; however, that is merely an example and any or all software may be loaded and run from the IMPS or anywhere in the networked environment. Additionally the CPP supports management interfaces used to configure and control the instance. The CPP is composed of redundant storage processors and is further described with reference to FIG. 3.

The DAE, together with the disks that it contains provide the persistent storage of the meta-data for the FabricX instance. The meta data includes configuration information that identifies the components of the instance, for example, the identities of the intelligent switches that make up the instance, data describing the set of exported virtual volumes, the software for the Controller, information describing what hosts and initiators are allowed to see what volumes, etc. The DAE is further described with reference to FIG. 4. The IMPS 22 or 24 provide storage virtualization processing in the data-path (also known as fast-path processing), and pass control to the CPP when exceptions occur for requests that it cannot handle.

Each FabricX instance may be managed by an administrator or user using EMS 29. A given EMS can be capable of managing one or more FabricX instances and communicates to the FabricX instance components through one or more IP networks.

Figure 3:
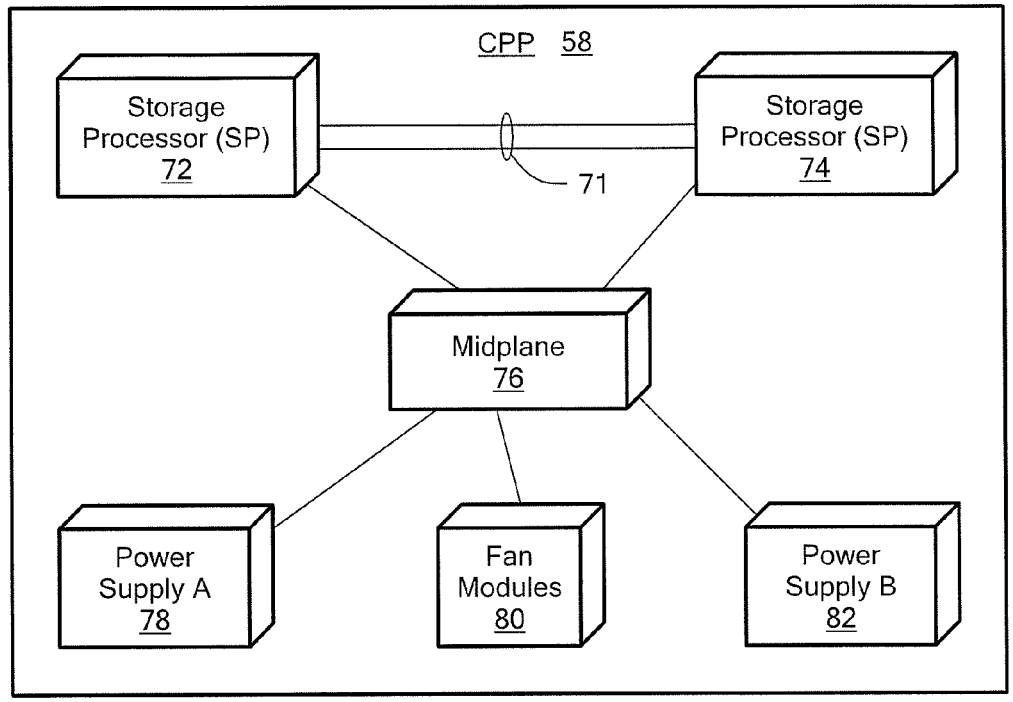
FIG. 3 is another block diagram showing hardware components of a processor included in the architecture and components of respective FIGS. 1 and 2.

Referring to FIG. 3, CPP 58 preferably includes two storage processors (SP's) 72 and 74, which may be two Intel Pentium IV microprocessors or similar. The two storage processors in the CPP communicate with each other via links 71, which may be for example redundant 2 Gbps Fibre Channel links, each provided in communication with the mid-plane 76. Each CPP contains fan modules 80 that connect directly to the mid-plane 76. The CPP contains two power supplies 78 and 82 (Power Supply A and B). In a preferred embodiment, the power supplies are redundant, have their own line cord, power switch, and status light, and each power supply is capable of providing full power to the CPP and its DAE. During normal operation the power supplies share load current. These redundant standby power supplies provide backup power to the CPP to ensure safety and integrity of the persistent meta-data maintained by the CPP.

Figure 4:
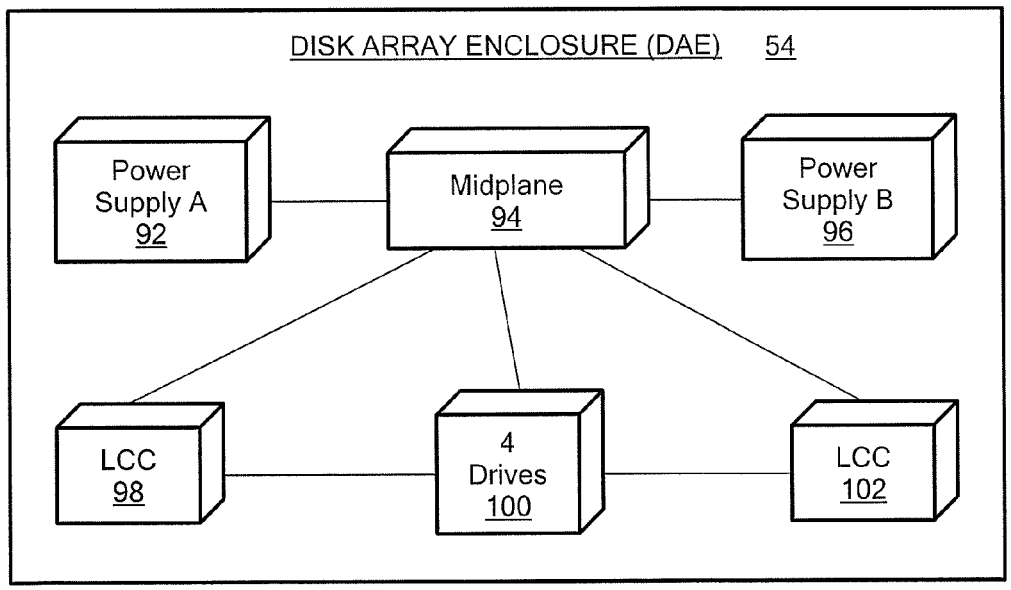
FIG. 4 is another block diagram showing hardware components of a disk array included in the architecture and components of respective FIGS. 1 and 2.

Referring to FIG. 4, the DAE 54 is shown. A FabricX instance 27 preferably has a single DAE 54, which is loaded with four disk drives 100 (the number of drives is a variable choice, however). These disk drives provide the persistent storage for meta-data of the instance, wherein the meta-data is used for certain management and control functions. None of this storage is directly accessible or visible to hosts on the front-end.

The meta-data on the disk drives is three-way mirrored to provide protection from disk failures. Each SP has a single arbitrated loop that provides its connection to the DAE. Each Link Control Card or LCC 98 and 102 connects the FabricX SP's to the meta-data storage devices or disk drives within the Disk Array Enclosure.

Figure 5:
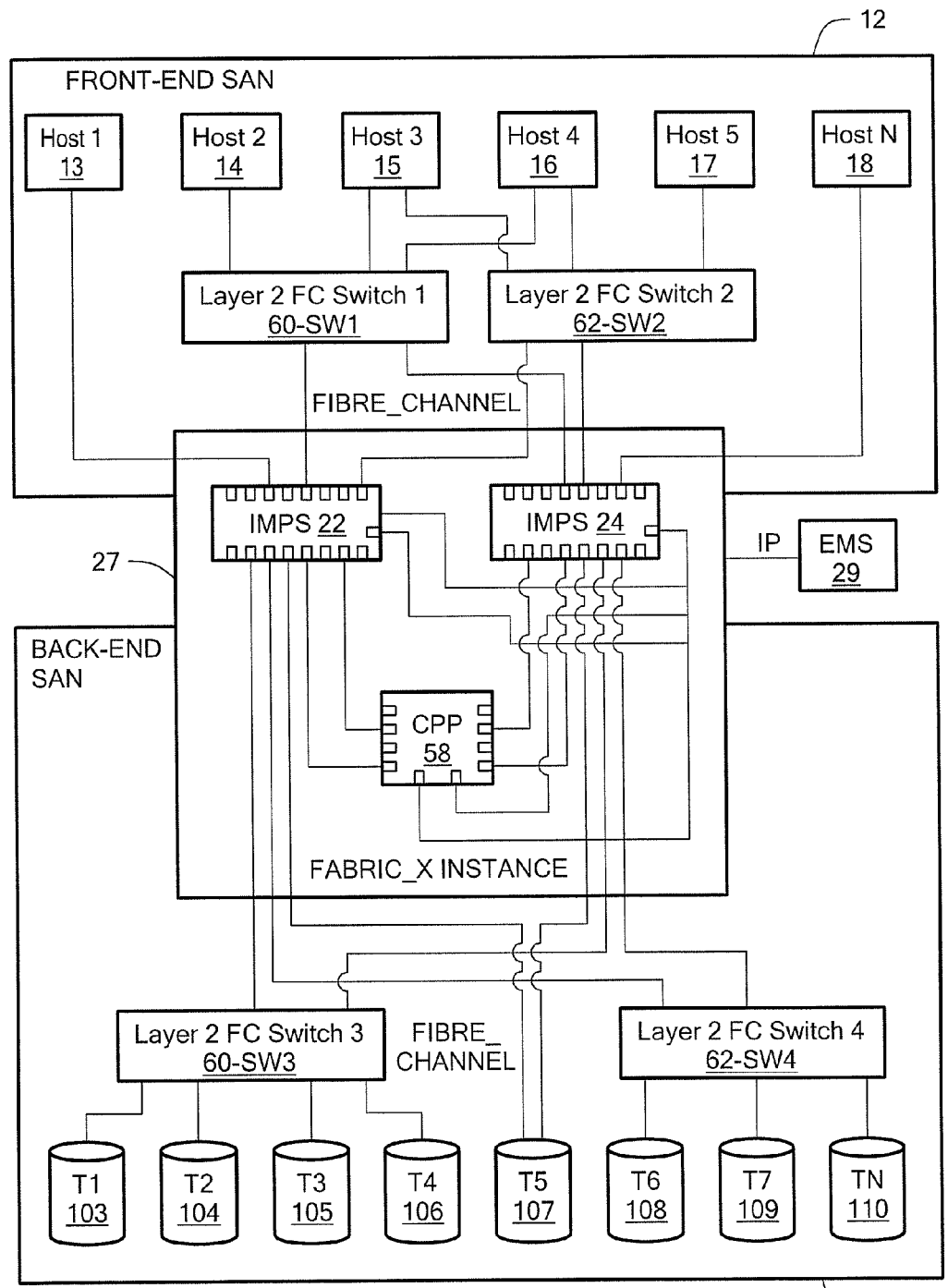
FIG. 5 is a schematic illustration of the architecture and environment of FIG. 1.

FIG. 5 shows a schematic illustration of the architecture and environment of FIG. 1 in detail with connectivity and in a two IMPS configuration (IMPS 22 and IMPS 24). Host Systems 13-18 communicate with FabricX via a SCSI protocol running over Fibre Channel. Each Fibre Channel port of each IMPS is distinguished as being either a front-end port, a back-end port, a control-port, or an inter-switch port. Hosts connect to the FabricX instance 27 via front-end ports. Front-end ports support SCSI targets and preferably have virtualizing hardware to make up an intelligent port. The host's connection to the port may be direct as in the case of labeled Host 1 or indirect such as Host 2 via layer 2 Fibre Channel switches such as Switch 60-SW 1 and Switch 62-SW2. Hosts may establish multiple paths to their storage by connecting to two or more separate front-end ports for high availability and performance; however, the preferred FabricX instance architecture allows hosts to be configured with a single path for the sake of simplicity. In some configurations, not shown for simplicity, the switches 60-SW1 and 62-SW2 could be combined and/or integrated with the IMPS without departing from the spirit of the invention.

An IMPS can be used to support virtual SAN's (VSAN's), to parse between front-end SAN's and back-end SAN's even if such SAN's are not physically configured. In general, switches that support VSANs allow a shared storage area network to be configured into separate logical SANs providing isolation between the components of different VSANs. The IMPS itself may be configured in accordance with specifications from such known switch vendors as Brocade and Cisco.

Each intelligent switch can contain a collection of SCSI ports, such as Fibre Channel, with translation processing functions that allow a port or associate hardware to make various transformations on the SCSI command stream flowing through that port. These transformations are performed at wire-speeds and hence have little impact on the latency of the command. However, intelligent ports are only able to make translations on read and write commands. For other SCSI commands, the port blocks the request and passes control for the request to a higher-level control function. This process is referred to as faulting the request. Faulting also occurs for read and write commands when certain conditions exist within the port. For example, a common transformation performed by an intelligent port is to map the data region of a virtual volume presented to a host to the data regions of back-end storage elements. To support this, the port maintains data that allows it to translate (map) logical block addresses of the virtual volume to logical back-end addresses on the back-end devices. If this data is not present in the port when a read or write is received, the port will fault the request to the control function. This is referred to as a map fault.

Once the control function receives a faulted request it takes whatever actions necessary to respond to the request (for example it might load missing map data), then either responds directly to the request or resumes it. The control function supported may be implemented differently on different switches. On some vendor's switches the control function is known to be supported by a processor embedded within the blade containing the intelligent ports, on others it is known to provide it as an adjunct processor which is accessed via the backplane of the switch, a third known configuration is to support the control function as a completely independent hardware component that is accessed through a network such as Fibre Channel or IP.

Back-end storage devices connect to FabricX via the Fibre Channel ports of the IMPSs that have been identified as back-end ports (oriented in FIG. 5 toward the back-end SAN). Intelligent ports act as SCSI initiators and the switch routes SCSI traffic to the back-end targets 103-110 respectively labeled T1-TN through the back-end ports of the respective IMPS's. The back-end devices may connect directly to a back-end IMPS if there is an available port as shown by T5, or they may connect indirectly such as in the case of T1 via a layer 2 Fibre Channel switch, such as Switch 60-SW3, and Switch 62-SW4.

The EMS 29 connects to FabricX through an IP network, e.g. an Ethernet network, which may be accessed redundantly. The FabricX CPP 58 in one embodiment has two 10/100 Mbps Ethernet NIC that is used both for connectivity to the IMPS (so that it can manage the IMPS and receive SNMP traps), and for connectivity to the EMS. It is recommended that the IP networks 624*a-b* provided isolation and dedicated 100 Mbps bandwidth to the IMPS and CPP.

The EMS in one embodiment is configured with IP addresses for each Processor 72-74 in the FabricX CPP. This allows direct connection to each processor. Each Processor preferably has its own Fibre Channel link that provides the physical path to each IMPS in the FabricX instance. Other connections may also work, such as the use of Gigabit Ethernet control path connections between the CPP and IMPS. A logical control path is established between each Processor of the CPP and each IMPS. The control paths to IMPS's are multiplexed over the physical link that connects the respective SP of the CPP to its corresponding IMPS. The IMPS provides the internal routing necessary to send and deliver Fiber Channel frames between the SP of the CPP and the respective IMPS. Other embodiments are conceivable that could use IP connectivity for the control path. In such a case the IMPS could contain logic to route IP packets to the SP. Further details of an exemplary system are described in U.S. Pat. No. 7,206,863, which is incorporated herein by reference.

In one aspect of the invention, a network is automatically provisioned end-to-end. In another aspect of the invention, methods and apparatus for creating storage pools are defined in terms of the characteristics of the storage that the user desires in the storage pool. When storage from the storage pool is requested, the system examines the current storage and selects storage candidates from the pool based on those characteristics. Policies are then applied to the storage candidates to order the resulting list of storage elements based on the policies. The storage can then be allocated to the user. In addition to storage ordering policies, users can assign attributes, including user-defined attributes, to the discovered storage to further enable dynamic selection of storage based on the value of the storage taking into account inherent storage attributes as well as user-assigned attributes.

FIGS. 6.1 and 6.2 show an exemplary sequence of steps for provisioning a network in accordance with exemplary embodiments of the invention. In general, users, e.g., business groups, request storage for database, data storage, etc., from time to time. Typically, a database administrator receives the request while a storage administrator has overall responsibility for managing storage resources and systems. The network is provisioned in response to such requests. The provisioning can be automatic and/or dynamic.

As described above, the storage is abstracted for the user. That is, the virtualization storage system can include different types of storage devices from different vendors. The user need not be concerned with such back-end details, but rather is provided storage as desired. The storage can be provided across a variety of storage resources in a manner that is transparent to the user.

In step 600, a database administrator submits a storage request to the storage administrator who submits an end-to-end provisioning request to the virtualization storage system in step 602. The request specifies a storage pool policy, volume creation policy and/or manual volume creation attributes. In step 604, the system searches for storage in a dynamic storage pool and storage connectivity elements, which is described more fully in FIG. 6A.

In step 606, it is determined whether existing structured or unstructured storage is available that matches the query. If not, processing terminates and the storage administrator can be notified.

In step 608, the system selects backend zones and VLANS (Virtual Local Area Networks) matching the provisioning request SLA (Service Level Agreement). In step 610, the system selects front-end zones/VLANs matching the request along with virtual initiators matching the SLAs. In step 612 a provisioning plan which gives the details of the decisions made by the previous steps is formulated. The provisioning plan includes the array and array storage, array ports, VTs (Virtual Targets), VT resources consumed and remaining, VIs (Virtual Initiators), VI resources consumed and remaining, backend zone or VLANS, Front-end zones or VLANS, VV (Virtual Volume) identity, and LUN numbers which have been allocated to the provisioning plan by the provisioning processing based upon the selections in step 602. The resources identified in the provisioning plan have been reserved and will be used to provision the storage and network connectivity from the host to the allocated storage.

The provisioning plan is then submitted to the storage administrator for approval in step 614. If the storage administrator does not approve the plan, as determined in step 616, the reserved storage is returned to the dynamic storage pool and the reserved network connectivity elements are returned to the network in step 618. If the provisioning plan is approved, in step 620, it is determined whether structured data for the plan exists. If not, in step 622, a structured data volume is created according to a volume creation policy. It is well known in the art how to create structured data volumes in accordance with a given volume creation policy.

In step 624, the system LUN masks and maps the array volume on selected array ports to selected virtual initiators. It is understood that volume masking and mapping, as well as VLANS and zones are well known to one of ordinary skill in the art. The backend zone/VLAN is created as necessary to allow connectivity between the Virtual Initiator and the array ports in step 626. In step 628, the array volume is imported as a storage element (SE) from which the system creates virtual volumes in step 630.

Figure 9:
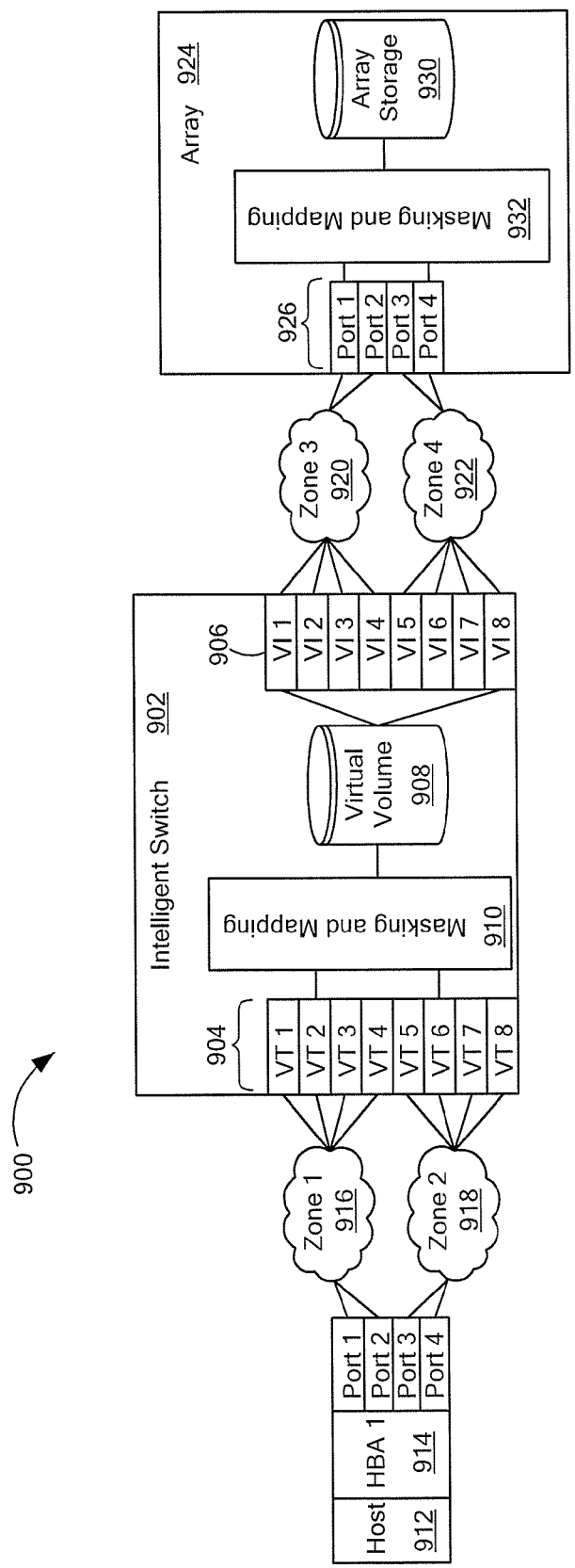
FIG. 9 is a schematic depiction of an illustrative system provisioned in accordance with exemplary embodiments of the invention.

The system then masks and maps the virtual volume on the selected virtual targets to the host HBA (Host Bus Adaptor) ports in step 632. In step 634, the system creates the zone/VLAN as necessary allowing connectivity between the Virtual Targets and HBA ports. FIG. 9, which is described further below, illustrates the connectivity from a host HBA port to the storage on the array through the intelligent switch via the VTs and VIs.

FIGS. 6A.1 and 6A.2 show additional processing details for step 604 in FIG. 6.1. In step 650 the system collects the detail attributes about the desired storage from the specified Dynamic Pool Definition and additional parameters supplied by the storage administrator and combines them into a SQL query referred to as a Dynamic Pool Request. This query is then used to query the database of all available storage on all available storage arrays using the attributes of the array storage as they exist at the moment the query is executed. The result of this query is a list of all arrays that have storage available to satisfy the storage administrator's storage request. A topology service is queried in step 652 to determine the connectivity of each array and intelligent switch building a matrix of which intelligent switches can connect to which arrays. It is understood that topology services to store information on network components, configuration, and connectivity, are well known to one of ordinary skill in the art. In step 654, the topology service is queried to obtain a list of connectivity paths from the intelligent switches to HBA ports identified in the provisioning request. The list is used to build a matrix of which HBA ports can connect to which intelligent switches.

Figure 10:
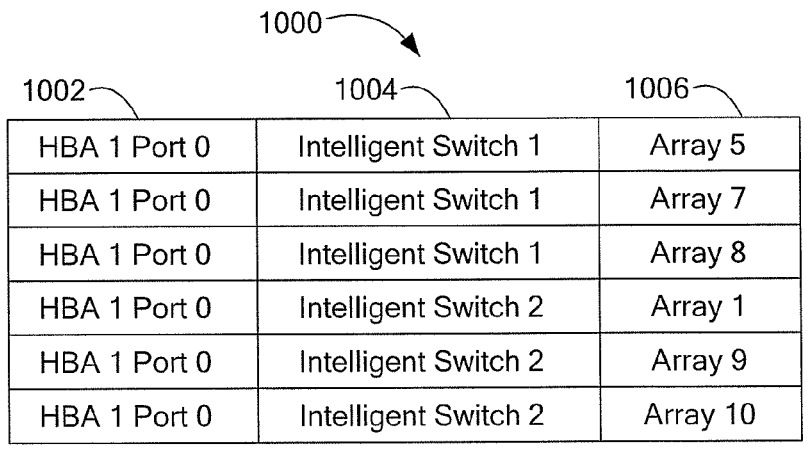
FIG. 10 is a tabular representation of triples generated including fields of HBA port, intelligent switch ID, and array number.
Figure 11:
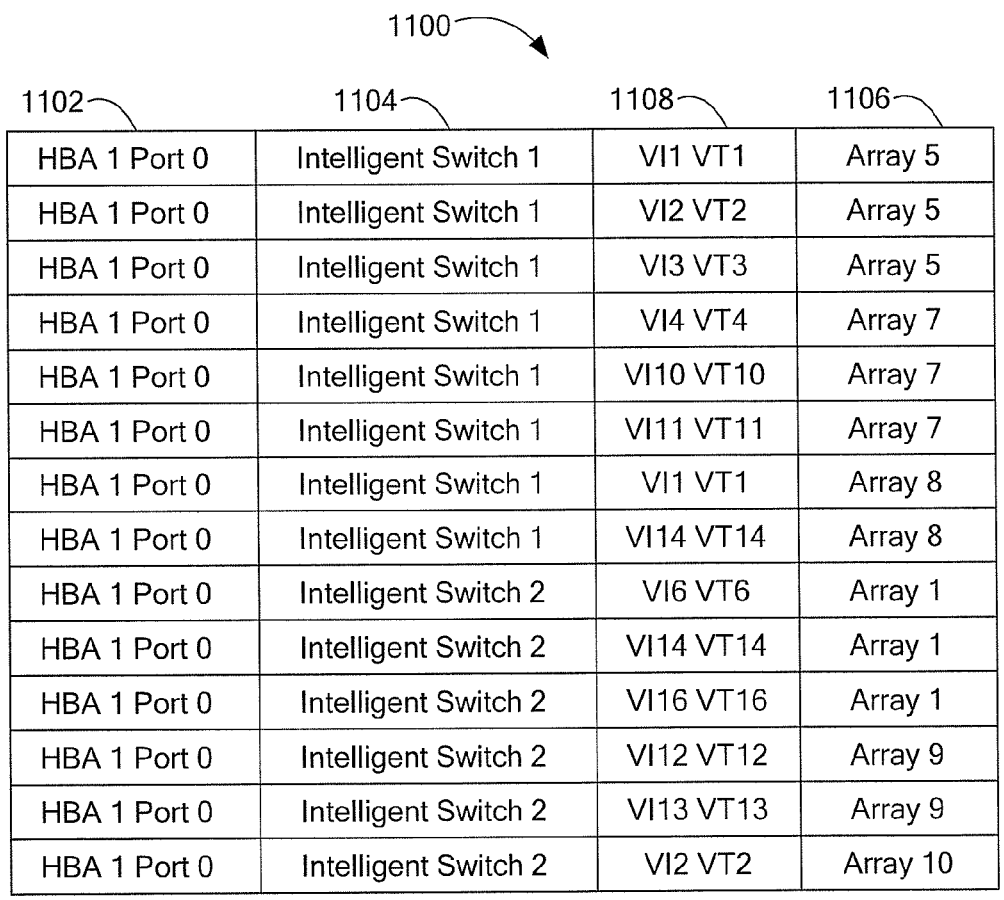
FIG. 11 is a tabular representation of a list including fields of HBA port, intelligent switch ID, VI-VT pair, and array number.

In step 656, the system creates a list of candidate HBA port/intelligent switch/array triples, as shown in FIG. 10 which is described further below, by performing an AND of the switches from step 652 and the switches from step 654 resulting in a list of intelligent switches which reside in both lists along with the associated HBA ports and arrays. In step 658, the system expands the list of HBA port/switch/array triples by adding one HBA port/intelligent switch/VT-VI pair/array entry, as shown in FIG. 11 which is described further below, in the resulting list for each VT/VI pair in each intelligent switch. In step 660, map space consumption is added for each VT in the created list resulting in a list of HBA port/intelligent switch/VT-VI pair/VT map space/array entries. Traffic loading (IOPS, read bytes per second, write bytes per second) is added in step 662 for each VT and VI in the created list resulting in a list of HBA port/intelligent switch/VT-VI pair/VT map space/VT traffic load/VI traffic load/array entries.

In step 664, the list is ordered by sorting, for example, on, VT map consumption, VT traffic loading, and/or VI traffic loading. In step 666, the system obtains a list of allocated ports on each array in the created list.

In an exemplary embodiment, in step 668, the system adds I/O operations per second, I/O bytes per second, and port maximum logins to each entry in the created in step 666. The list is then ordered, for example, by I/O operations per second, bytes/sec, and/or max logins, in step 670. In step 672 the system adds the first/next HBA port/intelligent switch/VT-VI pair/array from the ordered list of step 664 to the volume provisioning results. In step 674, the system adds the first/next array port from the list of step 670 to the volume provisioning results. In step 676, the system reserves switch VT-VI, array storage, and array port storage resources for the volume provisioning request.

In step 678, it is determined whether additional paths for the volume are required. If so, processing continues in step 672. If not, it is determined whether a sufficient number of VI-VT pairs have been found. If not, in step 682 the system releases reserved resources and returns a failure. If there are enough pairs, in step 684, the VI-VT/array selections are returned to enable further provisioning processing.

Figure 7:
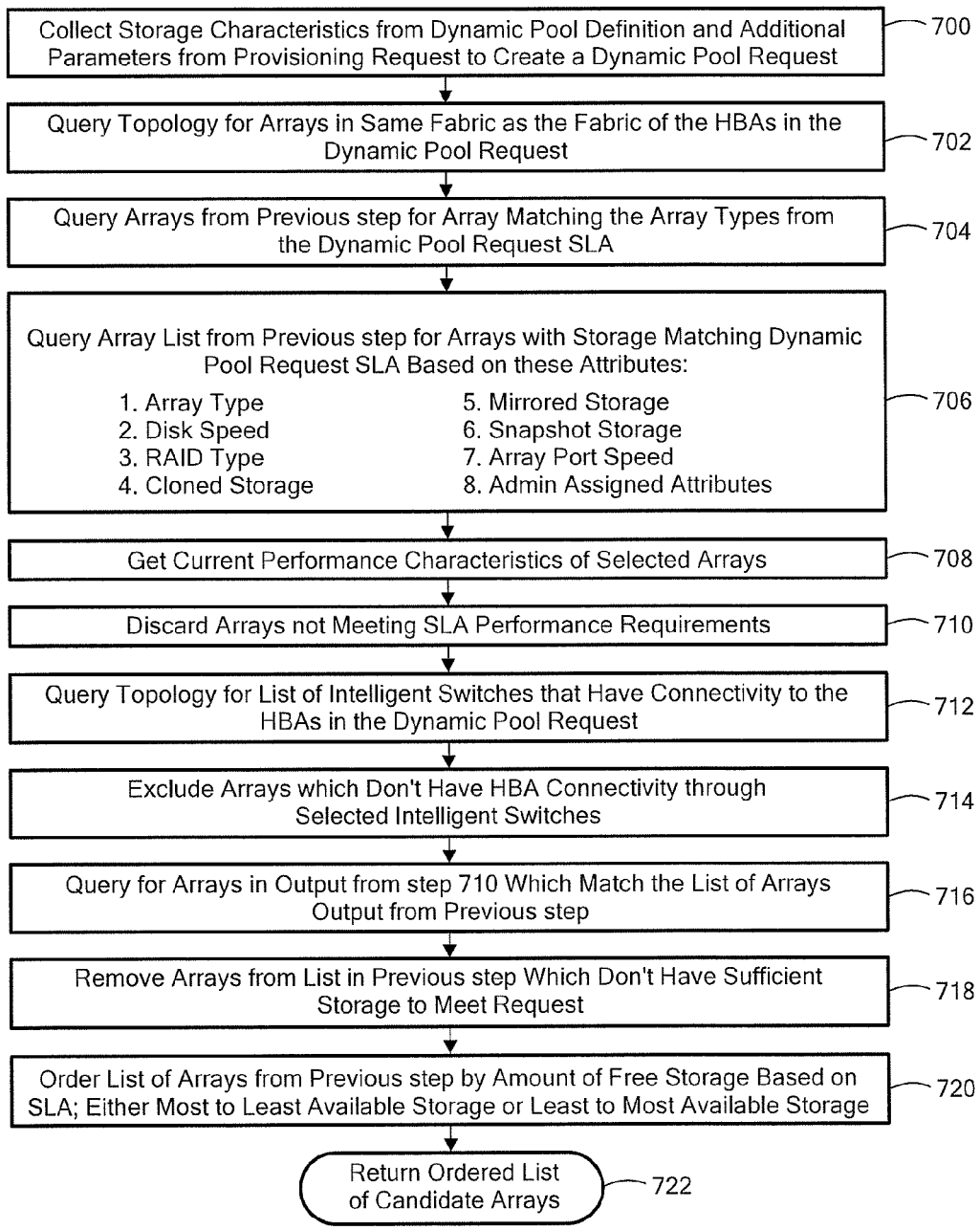
FIG. 7 is a flow diagram showing additional detail for the network provisioning of FIGS. 6A.1 and 6A.2 including generating a list of candidate arrays.

FIG. 7 shows further details for step 650 of FIG. 6A. In step 700, the system collects characteristics (such as array type, disk speed, RAID type, cloned storage, mirrored storage, snapshot storage, array port speed, and/or administrator defined attributes) from the dynamic storage pool definition (as an example the pool definition may be for a Symmetrix array with storage on 15K RPM drives which are protected by RAID 5) and further parameters (such as those specified by the user to override any of the parameters defining the pool) from the provisioning request (for example the provisioning request might be for 1 terabyte of storage on a Symmetrix array with storage of 15K RPM drives and has an administrator assigned attribute of "accounting") to create a dynamic pool request. In step 702, the topology service is queried to identify arrays in the same fabric as the fabric of the HBAs in the dynamic pool request. In step 704 the list of arrays created in step 702 is queried for arrays matching the array types from the dynamic pool request SLA. In step 706 the list of arrays from step 704 is queried for arrays with storage matching dynamic pool request SLA based on attributes, such as array type, disk speed, RAID type, cloned storage, mirrored storage, snapshot storage, array port speed, and/or administrator defined attributes. In step 708, the system obtains current performance characteristics of the selected arrays and in step 706. In step 710 arrays from step 708 not meeting the SLA performance requirements are discarded.

In step 712, the topology service is queried for a list of intelligent switches that have connectivity to the HBAs in the in the dynamic pool request. Arrays that do not have HBA connectivity through the VTs for the selected intelligent switches are excluded in step 714. In step 716, a query is made for arrays output from step 710 that match the list of arrays output from step 714 resulting is a list of arrays that have both the required performance and connectivity to the HBAs in the dynamic pool request. In step 718, arrays that do not have sufficient storage to meet the request are removed from the list. In step 720, list of arrays from step 718 is ordered by amount of free storage based upon the SLA. In step 722, the ordered list of arrays is returned for further provisioning processing.

FIG. 8 shows an exemplary user interface for provisioning a storage network in accordance with exemplary embodiments on the invention. In a first region of the screen 800, volume attributes can be specified by the user. In one part of the first region, a user can select a profile 802 for the attributes, such as ORACLE database with HA 804. In another part of the first region 806, a user can specify attributes for the storage. Exemplary attributes include meta volume allowed 808, clones 810, mirrors 812, snapshots 814, remote replication 816. In the illustrated embodiment, the user can select array type 818, RAID 820, storage type 822, and volume size 824.

In a second region 826 of the screen, the user can input a volume identity volume name 828 and LUN number 830. In a third region of the screen, the user must select host ports to be provisioned 832. Path attributes can be specified 834. Exemplary path attributes includes array port selection policy 836, e.g., balances and least used, and virtual target selection policy 838, e.g., balanced and least used, backend zone/VLAN 840 and Front-end Zone/VLAN 842.

It should be noted that in an exemplary embodiment, the only options that the user must set are a storage 808 profile and the host ports to be provisioned 832.

FIG. 9 shows an exemplary illustration of the connectivity from a host HBA port to the storage on an array through the intelligent switch via the VTs and VIs. FIG. 5 shows an exemplary system including hardware components and FIG. 9 shows an exemplary system with virtualization for provisioning in accordance with exemplary embodiments shown and described above.

The system 900 includes an intelligent switch 902 having a series of virtual targets 904 (shown as VT 1 to VT 8) and virtual initiators 906 (shown as VI 1 to VI 8) provided by a virtual volume 908 and a masking and mapping module 910. A host 912, having a first host bus adaptor HBA1 includes a series of ports 914 coupled to first and second zones 916, 918. In the illustrated embodiment, the first and second ports (Port 1 and Port 2) are coupled to the first zone 916 and the third and fourth ports (Port 3 and Port 4) are coupled to the second zone 918. It is understood that the zones can be provided by various switches, such as Fibre Channel switches. It is also understood that direct connections to the intelligent switch 902 can be provided.

The first and second zones 916, 918 are coupled to various ports on the intelligent switch 902 to provide connectivity to various virtual targets VTs. In the illustrated embodiment, the first zone 916 is coupled to virtual targets one through four (VT 1 to VT 4) and the second zone 918 is coupled to virtual targets VT 5 to VT 8. As described above, this can be referred to as the front end.

The masking and mapping module 910 and virtual volume 908 provide connectivity to the virtual initiators 906 (VI 1 to VI 8), which are coupled to third and fourth (backend) zones 920, 922. In the illustrated embodiment, VI 1 to VI 4 are connected to the third zone 920 and VI 5 to VI 8 are coupled to the fourth zone 922.

A storage array 922 is coupled to the third and fourth zones 920, 922 via various ports 926. In the illustrated embodiment, first and second ports (Port 1 and Port 2) are coupled to the third zone 920 and third and fourth ports (Port 3 and Port 4) are coupled to the fourth zone 922. The ports 926 on the array provide access to array storage 930 via a masking and mapping module 932.

With the above arrangement, a user is provided access to desired storage with the storage characteristics abstracted for the user. Storage can be provisioned across various devices transparently to the user.

FIG. 10 shows an exemplary illustration for step 656 of FIG. 6A where the system creates a list of candidate HBA port/intelligent switch/array triples 1000. In one embodiment, the list is created by performing a logical AND of the switches from step 652 and the switches from step 654 resulting in a list of intelligent switches that reside in both lists along with the associated HBA ports and arrays. The triples include a HBA port component 1002, an intelligent switch component 1004, and an array component 1006.

FIG. 11 shows an exemplary list 1100 created in accordance with step 658 of FIG. 6A in which the system expands the list of HBA port/switch/array triples by adding one HBA port/intelligent switch/VT-VI pair/array entry, resulting in a list for each VT/VI pair in each intelligent switch. The list includes a HBA port entry 1102, an intelligent switch identifier entry 1104, an array identifier 1106, and a VT-VI pair entry 1108.

FIG. 12 shows an exemplary list 1200 created in accordance with step 664 of FIG. 6A in which the system adds VT map resources, VT/VI I/Os per second (TOPS), VT/VI read bytes per second, and VT/VI write bytes per second to each entry resulting in a list ordered by VT map resources, VT/VI IOPS, VT/VI read bytes per second, and VT/VI write bytes per second. The list includes HBA port entry 1202, an intelligent switch identifier entry 1204, and array identifier 1106, a VT-VI pair entry 1208, VT map resources available 1210, VT and VI IOPS 1212, VT and VI read bytes per second 1214, and VT and VI write bytes per second.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A computer-implemented method, comprising:
   receiving a storage request having a storage pool policy, a volume creation policy, and volume creation attributes;
   searching available storage in a dynamic storage pool and storage connectivity elements based upon the storage request;
   selecting front-end and back-end virtual local area networks (VLANs), zones, and virtual initiators (VIs) matching a service level agreement (SLA) for the storage request;
   determining a provisioning plan for the storage request comprising a host bus adapter (HBA), HBA ports, an array, array ports, the virtual targets (VTs), the VIs, the zones, the VLANs, virtual volume identity, and logical units by examining resources for the VTs and VIs including resource usage and input/output operations per second to select a VT/VI pair based on the SLA;
   masking and mapping the array on the array ports to the VIs;
   masking and mapping the virtual volume on the VTs to the HBA ports;
   creating a front-end zone for connectivity between the virtual targets and host bus adaptor ports;
   creating a back-end zone for connectivity between the VIs and the array ports; and
   outputting the provisioning plan to a user for display.

2. The computer-implemented method of claim 1 wherein searching available storage in the dynamic storage pool and storage connectivity elements based upon the storage request comprises determining a list of arrays that have storage.

3. The computer-implemented method of claim 2 wherein searching the available storage in the dynamic storage pool and storage connectivity elements based upon the storage request comprises querying a topology service to determine connectivity of each array in the list of arrays that have storage.

4. The computer-implemented method of claim 2 wherein searching the available storage in the dynamic storage pool and storage connectivity elements based upon the storage request comprises determining I/Os per second, I/O bytes per second and port maximum logins for the arrays.

5. The computer-implemented method of claim 2 wherein determining the list of arrays that have storage comprises determining arrays that that meet the SLA in at least one of array type, disk speed, RAID type, cloned storage, mirrored storage; snapshot storage, array port speed and assigned attributes.

6. The computer-implemented method of claim 2 wherein determining the list of arrays that have storage comprises:
   determining performance characteristics of the arrays; and
   discarding arrays not meeting SLA performance requirements.

7. An apparatus to provide provisioning, comprising:
   circuitry to:
      receive a storage request having a storage pool policy, a volume creation policy, and volume creation attributes;
      search available storage in a dynamic storage pool and storage connectivity elements based upon the storage request;
      select front-end and back-end virtual local area networks (VLANs), zones, and virtual initiators (VIs) matching a service level agreement (SLA) for the storage request;
      determine a provisioning plan for the storage request comprising a host bus adapter (HBA), HBA ports, an array, array ports, the virtual targets (VTs), the VIs, the zones, the VLANs, virtual volume identity, and logical units by examining resources for the VTs and VIs including resource usage and input/output operations per second to select a VT/VI pair based on the SLA;
      mask and map the array on the array ports to the VIs;
      mask and map the virtual volume on the VTs to the HBA ports;
      create a front-end zone for connectivity between the virtual targets and host bus adaptor ports;
      create a back-end zone for connectivity between the VIs and the array ports; and
      output the provisioning plan to a user for display.

8. The apparatus of claim 7 wherein the circuitry comprises at least one of a processor, a memory, programmable logic and logic gates.

9. The apparatus of claim 7 wherein the circuitry to search available storage in the dynamic storage pool and storage connectivity elements based upon the storage request comprises circuitry to determine a list of arrays that have storage.

10. The apparatus of claim 9 wherein the circuitry to search available storage in the dynamic storage pool and storage connectivity elements based upon the storage request comprises circuitry to query a topology service to determine connectivity of each component in the list of arrays that have storage.

11. The apparatus of claim 9 wherein circuitry to search the available storage in the dynamic storage pool and storage connectivity elements based upon the storage request comprises circuitry to determine I/Os per second, I/O bytes per second and port maximum logins for the arrays.

12. The apparatus of claim 9 wherein the circuitry to determine the list of arrays that have storage comprises circuitry to determine arrays that meet the SLA in at least one of array type, disk speed, RAID type, cloned storage, mirrored storage; snapshot storage, array port speed and assigned attributes.

13. The apparatus of claim 9 wherein the circuitry to determine the list of arrays that have storage comprises circuitry to:
   determine performance characteristics of the arrays; and
   discard arrays not meeting SLA performance requirements.

14. An article, comprising:
   a non-transitory machine-readable medium that stores executable instructions to provide provisioning, the instructions causing a machine to:
      receive a storage request having a storage pool policy, a volume creation policy, and volume creation attributes;
      search available storage in a dynamic storage pool and storage connectivity elements based upon the storage request;
      select front-end and back-end virtual local area networks (VLANs), zones, and virtual initiators (VIs) matching a service level agreement (SLA) for the storage request;
      determine a provisioning plan for the storage request comprising a host bus adapter (HBA), HBA ports, an array, array ports, the virtual targets (VTs), the VIs, the zones, the VLANs, virtual volume identity, and logical units by examining resources for the VTs and VIs including resource usage and input/output operations per second to select a VT/VI pair based on the SLA;
      mask and map the array on the array ports to the VIs;
      mask and map the virtual volume on the VTs to the HBA ports;
      create a front-end zone for connectivity between the virtual targets and host bus adaptor ports;
      create a back-end zone for connectivity between the VIs and the array ports; and
      output the provisioning plan to a user for display.

15. The article of claim 14 wherein the instructions causing a machine to search available storage in the dynamic storage pool and storage connectivity elements based upon the storage request comprises instructions causing a machine to determine a list of arrays that have storage.

16. The article of claim 15 wherein the instructions causing a machine to search available storage in the dynamic storage pool and storage connectivity elements based upon the storage request comprises instructions causing a machine to query a topology service to determine connectivity of each component in the list of arrays that have storage.

17. The article of claim 16 wherein instructions causing a machine to search the available storage in the dynamic storage pool and storage connectivity elements based upon the storage request comprises instructions causing a machine to determine I/Os per second, I/O bytes per second and port maximum logins for the arrays.

18. The article of claim 16 wherein the instructions causing a machine to determine the list of arrays that have storage comprises instructions causing a machine to determine arrays that meet the SLA in at least one of array type, disk speed, RAID type, cloned storage, mirrored storage; snapshot storage, array port speed and assigned attributes.

19. The article of claim 16 wherein the instructions causing a machine to determine the list of arrays that have storage comprises instructions causing a machine to:
   determine performance characteristics of the arrays; and
   discard arrays not meeting SLA performance requirements.

* * * * *